United States Patent Office 2,790,112
Patented Apr. 23, 1957

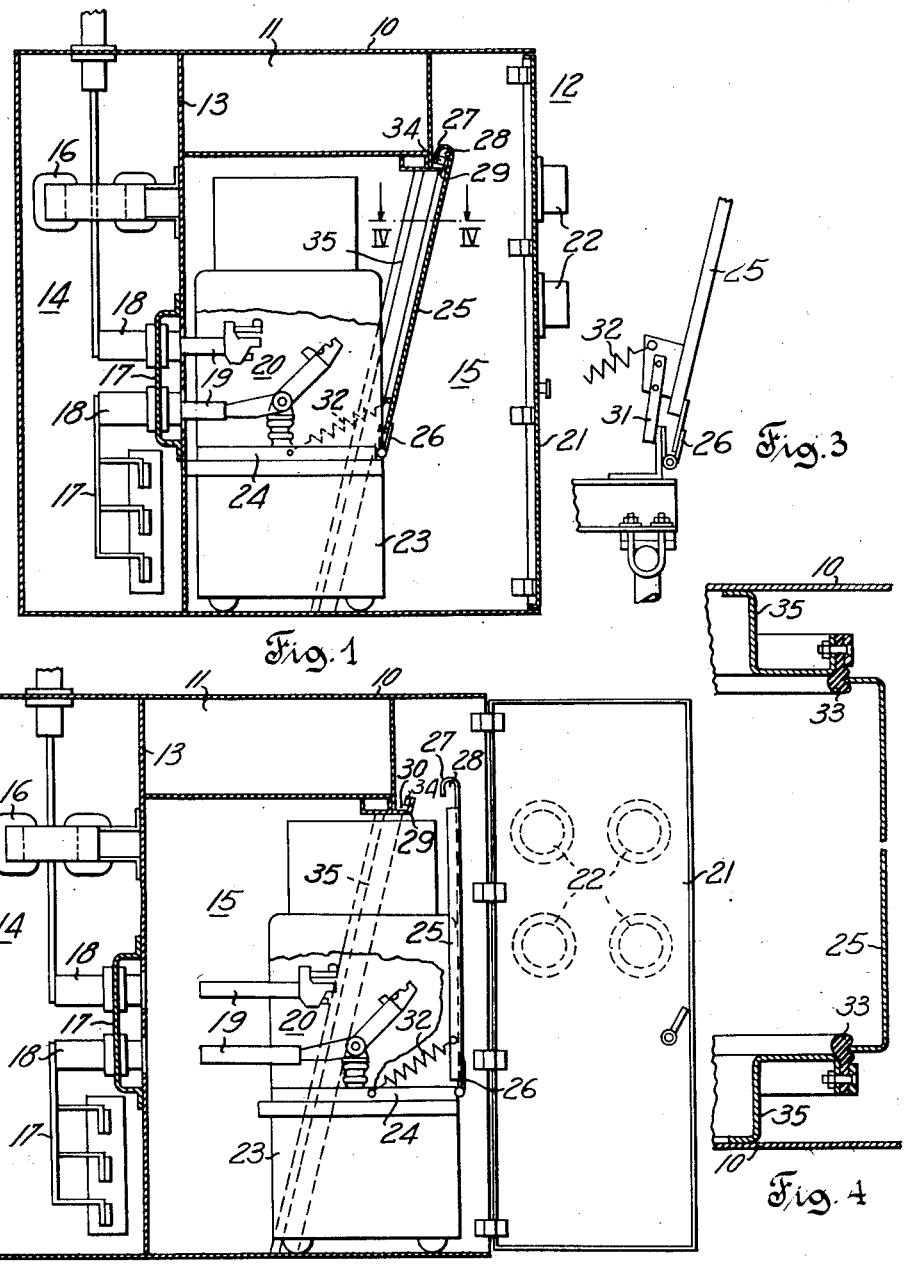

2,790,112

HINGED PANEL COOPERATING WITH SWITCHGEAR CUBICLE FOR OPERATOR'S PROTECTION

Leonard J. Linde, Needham, Mass., assignor to Allis-Chalmers Manufacturing Company, Milwaukee, Wis.

Application October 6, 1953, Serial No. 384,490

11 Claims. (Cl. 317—103)

This invention relates generally to improvements in metal enclosed switchgear of the drawout type and more particularly to the structure of a shielding panel therefor.

Such metal enclosed switchgear usually consists of a grounded stationary metal structure containing a plurality of circuit breakers, a power bus, power feeder connections and associated equipment such as instruments and instrument transformers. The bus, feeder connections and transformers are usually placed in separate metal enclosed compartments within the structure. The instruments such as meters and control switches are usually mounted on the doors of this metal housing structure.

Generally, the circuit breaker is arranged on a movable metal structure which can be pushed into the stationary structure to automatically connect the breaker to the bus and to the feeder connections, this movable structure usually being provided with a fixed metal panel which closely fits the stationary structure in the energized position of the breaker to isolate the breaker from the space immediately behind the door and thereby to protect operating personnel against accidental contact with the live metal parts of the breaker and to protect the instruments and instrument connections from heated conducting gases that may be generated in the event of an abnormal operation of the breaker.

It is apparent that in such a movable structure the fixed metal panel, which is at substantially ground potential, must be spaced apart from the live parts of the breaker sufficiently to prevent dielectric failure under the most extreme conditions of breaker operation.

To conserve on cubicle space and to afford the maximum protection to the instruments mounted on the door of the metal housing structure a new and improved shielding panel is pivotally mounted on the switch or circuit breaker structure. This panel is held vertically against the circuit breaker structure when the latter is out of the stationary structure or is in the stationary structure but out of the circuit breaker energized position, under either of which conditions the panel need not have more than physical clearance from the energized portions of the breaker. When the circuit breaker is moved to energized position in the cubicle, the panel mounted on the circuit breaker engages a portion of the cubicle which rotates the panel away from the switch to a diagonal position. This diagonal position of the panel places the panel which is usually grounded at the base of the circuit breaker at a distance from the energized portions of the circuit breaker and between the circuit breaker and the instruments mounted on the door of the cubicle.

It is therefore one object of the present invention to provide a metal clad switchgear structure housing a switch and having an instrument panel door in which the instrument panel door is protected in a new and improved manner from the harmful effects of the arc.

Another object of this invention is to provide a new and improved shielding panel for a circuit breaker structure mounted within a cubicle in which when the circuit breaker is moved to energized position is automatically brought into proper relation with the walls of the cubicle to protect the operating personnel.

A further object of this invention is to provide a new and improved shielding panel for a circuit breaker structure mounted within a cubicle in which when the circuit breaker is moved to energized position is automatically brought into proper position to protect the operating personnel even though the door of the cubicle remains open or is disassembled.

Objects and advantages other than those above set forth will be apparent from the following description when read in connection with the accompanying drawing, in which:

Fig. 1 is a side elevational view of the drawout type switchgear equipment mounted in a cubicle in circuit closed position and embodying this invention;

Fig. 2 is a side elevational view of drawout type switchgear equipment of Fig. 1 mounted in a cubicle in circuit open position and embodying this invention;

Fig. 3 is an enlarged view of the panel mounting means shown in Figs. 1 and 2; and Fig. 4 is an enlarged broken view taken along the line IV—IV of Fig. 1.

Referring more particularly to the drawing by characters of reference, Fig. 1 illustrates an electrical switchgear unit of the metal clad type comprising a box like skeleton frame 10 covered by a sheet metal wall structure 11 to form an enclosure or cubicle like structure 12 housing the electrical apparatus of the unit. Structure 12 is divided by a wall 13 in two compartments, namely compartment 14 and compartment 15. Compartment 14 located at the left side of structure 12 as shown in Figs. 1 and 2 forms a housing for the usual current transformer 16 and bus bar mountings 17. The current transformer 16 is connected to the sationary portion of the primary disconnecting contacts disposed within the insulating shells 18. The insulating shells 18 are open at the right sides and are mounted on walls 13 in alignment with apertures therein so as to receive the movable portions 19 of the primary disconnecting contacts which are carried by a switch or circuit breaker diagrammatically shown at 20. The switch or circuit breaker 20 shown herein is a three pole breaker but since the construction of all three poles are similar only one pole structure need be described.

The circuit breaker 20, which may be of any of the well known types such as an air magnetic type power circuit breaker, is mounted on a switch supporting means 24 which in turn is mounted on a vehicular fabricated base structure 23. Base structure 23 is adapted for horizontal reciprocal movement between disconnected and connected positions with respect to the bus bar connections. The wheels of the base structure form the means for actuating and bodily shifting the switch or circuit breaker from a deenergized position into an energized position. As shown in Fig. 1, the circuit breaker 20 is in the connected position with the stationary portions of the primary disconnecting contacts within shells 18 being in engagement with the coacting movable portions 19 of these disconnecting contacts associated with the circuit breaker 20 so that an electric circuit may be completed through the circuit breaker 20.

The housing structure 12 is provided with a hinged door 21 upon which is mounted control devices 22 such as meters, switches, lights, etc., for operating the switchgear unit.

In accordance with the invention claimed, a shielding panel 25 is pivotally mounted on the switch or circuit breaker structure 20. Panel 25 may be made of a metallic material and fastened by a hinge 26 at one end of the panel 25 to the frame structure or supporting means 24 of the circuit breaker 20. Panel 25 is arranged on the side of the circuit breaker 20 facing the door structure 21 of the cubicle 12 and extends from the base to the top of the circuit breaker to substantially shield the door 21 of the cubicle 12 from the arc and arc products and to shield the operator from live parts of the switch or circuit breaker when the door 21 is open.

Panel 25 is pivotally mounted on hinge 26 at one end thereof and is provided with an inverted U-shaped member or portion 27 at the other end thereof. Panel 25 is held by a spring biasing means 32 in a vertical position against the side of the switch supporting means when the switch or circuit breaker is outside of the cubicle or in the cubicle in a deenergized position. A vertical well or recess 28 is formed by the inverted U-shaped member 27.

Cubicle 12 is provided with a suitable locking means for engaging the inverted U-shaped member 27 and shown as a U-shaped member 29 having a vertical recess 30 is mounted on part of frame 10 of cubicle 12. One leg of U-shaped member 29 is provided with a resilient strip 34 for engaging the cooperating leg of U-shaped member 27. When the vehicular base structure 23 is moved toward circuit closed or energized position the U-shaped member 29 is so disposed that one leg of the inverted U-shaped member 27 moves into the recess 30 of U-shaped member 29 and is locked with the frame 10. Further movement of base structure 23 causes the panel 25 to rotate or pivot away from the supporting means 24 about its hinge 26 to a diagonal position shown in Fig. 1. As shown in Fig. 1 the adjacent legs of U-shaped members 27 and 29 are disposed in vertical recesses 30 and 28, respectively. In this manner, the frame 10 and the panel 25 are securely locked in position.

The base structure 23 and circuit breaker 20 may be moved to a deenergized position by simply moving base structure 23 to the right. This movement of base structure 23 causes the panel to be rotated counterclockwise until the leg of U-shaped member 27 withdraws from recess 30 of U-shaped member 29. Panel 25 is then in a substantially vertical position and is free from its engagement with frame 10 of cubicle 12.

Panel 25 further cooperates with a sealing means comprising a pair of rails 35 mounted within cubicle 12 to enclose the switch or circuit breaker 20 when it is in the energized position. Rails 35 are provided with resilient material 33 mounted thereon in such a manner that the edges of panel 25 embed themselves in material 33 to form a gas tight seal. The locking means comprising the U-shaped member 29 is provided with the resilient strip 34 for engaging one leg of the inverted U-shaped member 27 when this leg is moved into recess 30 of member 29 to form a gas tight seal. Thus, when the switch or circuit breaker 20 is moved into energized position in cubicle 12 the U-shaped member 29 rotates panel 25 away from the supporting means 24 and into engagement with the rails 35 of the panel sealing means to effectively isolate the switch or circuit breaker from the door 21 of cubicle 12 and from the operating personnel.

When the switch or circuit breaker is in a deenergized position and the panel is in a vertical position, the door of the cubicle may be closed. This type of panel arrangement makes it possible to afford the benefits of personnel protection during movement of the switch or circuit breaker without increasing the overall cubicle size.

From the foregoing it is apparent that a new and improved shielding panel is provided which is automatically brought into proper relation with the cubicle and particularly the door of the cubicle to protect the control instrument mounted on the door and the operating personnel. Further, the panel is rotated to its proper position even though the door of the cubicle is opened or disassembled. A safety stop 31 is provided to keep the panel from moving diagonally beyond a predetermined position.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In drawout type switchgear, the combination comprising a cubicle, a switch, means mounted within said cubicle for supporting said switch, means for actuating said supporting means to bodily shift said switch from a deenergized position into an energized position, a shielding panel pivotally mounted on said supporting means, means for holding said panel against said supporting means when said switch is in a deenergized position, and means mounted on said cubicle for rotating said panel away from said supporting means when said switch is moved into the energized position.

2. In drawout type switchgear, the combination comprising a cubicle, a switch, means mounted within said cubicle for supporting said switch, means for actuating said supporting means to bodily shift said switch from a deenergized position into an energized position, a shielding panel pivotally mounted on said supporting means, means for holding the flat side of said panel against said supporting means when said switch is in a deenergized position, and means mounted on said cubicle for rotating said panel away from said supporting means when said switch is moved into the energized position.

3. In drawout type switchgear, the combination comprising a cubicle, a switch, means mounted within said cubicle for supporting said switch, means for actuating said supporting means to bodily shift said switch from a deenergized position into an energized position, a shielding panel pivotally mounted on said supporting means, means for holding said panel in a substantially vertical position against said supporting means when said switch is in a deenergized position, and means mounted on said cubicle for rotating said panel away from said supporting means to a diagonal position when said switch is moved into the energized position.

4. In a drawout type switchgear, the combination comprising a cubicle, a switch, means mounted within said cubicle for supporting said switch, means for actuating said supporting means to bodily shift said switch from a deenergized position into an energized position, a shielding panel pivotally mounted on said supporting means at one end of said panel and provided with an inverted U-shaped portion at the other end of said panel, means for holding said panel against said supporting means when said switch is in a deenergized position, and means mounted on said cubicle for engaging said U-shaped portion of said panel and rotating said panel away from said supporting means when said switch is moved into the energized position.

5. In drawout type switchgear, the combination comprising a cubicle, a switch, means movably mounted within said cubicle for supporting said switch, means for actuating said supporting means to bodily shift said switch from a deenergized position into an energized position, a shielding panel pivotally mounted on said supporting means at one end of said panel and provided with an inverted U-shaped portion at the other end of said panel, means for holding said panel against said supporting means when said switch is in a deenergized position, and means mounted on said cubicle for engaging and locking said U-shaped portion of said panel to said cubicle and for rotating said panel away from said supporting means when said switch is moved into the energized position.

6. In a drawout type switchgear, the combination comprising a cubicle, a switch, means mounted within said cubicle for supporting said switch, means for actuating said supporting means to bodily shift said switch from a deenergized position into an energized position, a shielding panel pivotally mounted at one end thereof on said supporting means and provided with an inverted U-shaped member at the other end of said panel, means for holding said panel against said supporting means when said switch is in a deenergized position, and means comprising a U-shaped member on said cubicle cooperating with the U-shaped member on said panel for locking said panel and said cubicle together and for rotating said panel away from said supporting means when said switch is moved into the energized position.

7. In drawout type switchgear, the combination comprising a cubicle, a switch, means mounted within said cubicle for supporting said switch, means for actuating said supporting means to bodily shift said switch from a deenergized position into an energized position, a hinge attached to said switch, a shielding panel connected to said hinge, said panel providing an inverted U-shaped member on one side thereof, spring means for holding said panel against said supporting means when said switch is in a deenergized position, and U-shaped means attached to said cubicle for engaging said inverted U-shaped member on said panel and rotating said panel away from said supporting means when said switch is moved into the energized position.

8. In drawout type switchgear, the combination comprising a cubicle, a switch, means mounted within said cubicle for supporting said switch, means for actuating said supporting means to bodily shift said switch from a deenergized position into an energized position, a shielding panel pivotally mounted on said supporting means, means for holding said panel against said supporting means when said switch is in a deenergized position, sealing means mounted in said cubicle for cooperating with said panel and said cubicle to enclose said switch when said switch is in an energized position, and means mounted on said cubicle for rotating said panel away from said supporting means and into engagement with said sealing means when said switch is moved into the energized position.

9. In drawout type switchgear, the combination comprising a cubicle, a switch, means mounted within said cubicle for supporting said switch, means for actuating said supporting means to bodily shift said switch from a deenergized position into an energized position, a shielding panel pivotally mounted on said supporting means, means for holding said panel against said supporting means when said switch is in a deenergized position, sealing means comprising a pair of rails mounted in said cubicle for cooperating with said panel and said cubicle to enclose said switch when said switch is in an energized position, resilient material mounted on said rails to provide a gas tight seal between said rails and said panel upon engagement thereof, and means mounted on said cubicle for rotating said panel away from said supporting means and into engagement with said sealing means when said switch is moved into the energized position.

10. In drawout type switchgear, the combintion comprising a cubicle, a switch, means mounted within said cubicle for supporting said switch, means for actuating said supporting means to bodily shift said switch from a deenergized position into an energized position, a shielding panel pivotally mounted on said supporting means at one end of said panel and provided with an inverted U-shaped portion at the other end of said panel, means for holding said panel against said supporting means when said switch is in a deenergized position, sealing means mounted in said cubicle for cooperating with said panel and said cubicle to enclose said switch when said switch is in an energized position, and means mounted on said cubicle for engaging said U-shaped portion of said panel and rotating said panel away from said supporting means and into engagement with said sealing means when said switch is moved into the energized position.

11. In drawout type switchgear, the combination comprising a cubicle, a switch, means mounted within said cubicle for supporting said switch, means for actuating said supporting means to bodily shift said switch from a deenergized position into an energized position, a shielding panel pivotally mounted on said supporting means at one end of said panel and provided with an inverted U-shaped portion at the other end of said panel, means for holding said panel against said supporting means when said switch is in a deenergized position, sealing means comprising a pair of rails mounted in said cubicle for cooperating with said panel and said cubicle to enclose said switch when said switch is in an energized position, means mounted on said cubicle for engaging said U-shaped portion of said panel and rotating said panel away from said supporting means into engagement with said rails when said switch is moved into the energized position, and resilient material mounted on said rails and said rotating means to provide a gas tight seal between said rail means, said rotating means and said panel.

References Cited in the file of this patent

UNITED STATES PATENTS

| | | |
|---|---|---|
| 1,885,365 | Macneil | Nov. 1, 1932 |
| 2,533,645 | Valgovskay | Dec. 12, 1950 |
| 2,558,074 | Claybourn | June 26, 1951 |
| 2,579,992 | Wood | Dec. 25, 1951 |